(12) United States Patent
Keeler et al.

(10) Patent No.: US 6,527,286 B2
(45) Date of Patent: Mar. 4, 2003

(54) VEHICLE SUSPENSION ASSEMBLY

(75) Inventors: Michael J. Keeler, Blacklick, OH (US); Ashley Dudding, Plainfield, IL (US); Jerome Cortez, Chicago, IL (US)

(73) Assignee: The Boler Company, Itasca, IL (US)

( * ) Notice: Subject to any disclaimer, the term of this patent is extended or adjusted under 35 U.S.C. 154(b) by 0 days.

(21) Appl. No.: 09/731,673

(22) Filed: Dec. 6, 2000

(65) Prior Publication Data

US 2002/0067017 A1 Jun. 6, 2002

(51) Int. Cl.$^7$ ................................................. B60G 3/18
(52) U.S. Cl. ............................................. 280/124.135
(58) Field of Search ...................... 280/124.135, 124.11, 280/124.111, 124.13, 124.116, 124.106, 124.107, 124.157, 683, 684, 685; 180/349, 352

(56) References Cited

U.S. PATENT DOCUMENTS

| | | | |
|---|---|---|---|
| 2,740,622 A | | 4/1956 | Hickman |
| 2,855,212 A | | 10/1958 | Houser |
| 3,007,715 A | * 11/1961 | Maharick ............... 280/124 |
| 3,007,716 A | * 11/1961 | Maharick ............... 280/124 |
| 3,380,758 A | | 4/1968 | Granning |
| 3,630,541 A | * 12/1971 | Carlson ............... 280/124 |
| 5,127,668 A | * 7/1992 | Raidel ............... 280/711 |
| 5,458,359 A | * 10/1995 | Brandt ............... 280/673 |
| 5,524,921 A | * 6/1996 | Ellingsen ............... 280/713 |
| 5,549,320 A | * 8/1996 | Ellingsen ............... 280/689 |
| 5,564,521 A | | 10/1996 | McLaughlin et al. |
| 5,649,719 A | | 7/1997 | Wallace et al. |
| 5,785,345 A | * 7/1998 | Barlas et al. ............... 280/715 |
| 5,882,031 A | * 3/1999 | VanDenberg ............... 280/683 |
| 5,988,672 A | * 11/1999 | VanDenberg ............... 280/683 |
| 6,109,630 A | * 8/2000 | Dazy et al. ............ 280/124.11 |
| 6,129,367 A | * 10/2000 | Bublies et al. ........ 280/124.107 |

FOREIGN PATENT DOCUMENTS

| | | | |
|---|---|---|---|
| DE | 199 20 670 A1 | 11/2000 | |
| EP | 0 949 093 A2 | 10/1999 | |
| GB | 873877 | 8/1961 | |
| GB | 1305511 | 2/1973 | |
| JP | 01237718 | 4/1991 | |
| JP | 405016631 A | * 1/1993 | ........ 280/FOR 145 |
| JP | 406127247 A | * 5/1994 | ........ 280/FOR 170 |
| JP | 05095635 | 10/1994 | |
| WO | WO97/00176 | 1/1997 | |

\* cited by examiner

Primary Examiner—Brian L. Johnson
Assistant Examiner—Kelly E Campbell
(74) Attorney, Agent, or Firm—Buckingham, Doolittle & Burroughs, LLP; David P. Dureska

(57) ABSTRACT

A suspension assembly for supporting an axle on a vehicle frame includes a pair of transversely spaced hangers mounted on and depending from the frame. Each one of a pair of longitudinally extending control arms is pivotally attached at one end of its ends to a respective one of the hangers, and at the other of its ends to a respective one of a pair of axle seats. The axle seats rigidly capture the transversely extending axle. A support member is attached to and extends longitudinally rearwardly from each of the axle seats for mounting an air spring and a shock absorber. Each of the air springs and shock absorbers extend upwardly from its respective support member and is attached to the frame. A generally rigid torque box is immovably attached at one of its ends to the frame, and at the other of its ends to the axle. The torque box is a hollow fabrication closed at each of its attachment ends by a mounting tube. A shaft having at least one bushing molded about the shaft is press fit into each of the tubes. The three components of the suspension assembly react the various loads imposed on the axle during operation of the vehicle, including vertical, lateral and longitudinal forces, and roll and yaw movements of the axle, without the use of traditional beams, thereby saving parts and/or complexity, cost and weight. The suspension assembly advantageously minimizes axle wind-up.

16 Claims, 6 Drawing Sheets

VEHICLE SUSPENSION ASSEMBLY

BACKGROUND OF THE INVENTION

1. Field of the Invention

The invention relates to vehicle suspension assemblies, and in particular to a suspension assembly for controlling the position of an axle relative to a vehicle frame during operation of the vehicle. More particularly, the invention relates to a vehicle suspension assembly for maintaining the relative position of the axle, wherein the assembly has reduced complexity, weight and cost due to replacement of conventional suspension assembly beams with a fabricated torque box structure.

2. Background Art

Axle/suspension systems for vehicles arguably are one of the most important structures of a vehicle, because they ensure a comfortable ride to the passengers in the vehicle and protect any cargo that the vehicle may be carrying from excessive shocks. Axle/suspension systems also provide stability to the vehicle by controlling various forces acting on the axle itself, which in turn could cause an unwanted change in position of the axle relative to the vehicle frame. Specifically, such forces operate to alter the vertical, lateral, and/or longitudinal position of the axle in relation to the vehicle frame, and also can cause axle movement such as roll, yaw, and wind-up.

A typical axle/suspension system usually limits the six possible axle motions by incorporating into the suspension assembly, which supports the axle, a number of components that react to and control the various forces. Although such conventional suspension assemblies generally serve their intended function, the number and/or type of components in a typical prior art assembly also contribute unwanted complexity, weight and cost to the suspension assembly.

The present invention significantly lessens the aforementioned problems by reducing the number and/or complexity of parts needed to control the forces imposed on the axle, and specifically by replacing the pair of beams of a typical prior art suspension assembly with a fabricated "torque box." Depending on the prior art suspension assembly being compared, the present invention incorporating the torque box concept either reduces the number and complexity of parts to save cost and weight, or reduces complexity alone to achieve the same savings. The resulting simplified suspension assembly of the present invention also exhibits design flexibility whereby its suspension characteristics, such as roll rate, for example, can be readily changed for adapting the assembly concept to different types of vehicle requirements.

SUMMARY OF INVENTION

Objectives of the present invention include providing a suspension assembly for a vehicle which generally maintains the position of the rigid axle relative to the vehicle frame during vehicle operation, by limiting the vertical, lateral, and longitudinal displacement of the axle, as well as roll, yaw and wind-up axle movements.

Another object of the present invention is to provide such a vehicle suspension assembly which has a reduced number and/or complexity of parts, resulting in less weight and cost, and which is "non-reactive" or generally free of significant axle wind-up or torque.

A still further objective of the present invention is to provide such a suspension assembly which is easily adapted to different suspension characteristic needs of vehicles.

These objectives and advantages are obtained by a suspension assembly for mounting an axle on a longitudinally extending vehicle structure, the suspension assembly including a pair of transversely spaced hangers, each one of the pair of hangers being mounted on and depending from the vehicle structure, a pair of longitudinally extending control arms, each one of the pair of control arms having a first end and a second end, the first end of each one of the control arms being pivotally attached to a respective one of the pair of hangers through a bushing, and the second end of each one of the control arms being pivotally attached to a respective one of a pair of axle seats through a bushing, the pair of axle seats immovably capturing a transversely extending axle, a pair of transversely spaced air springs, each one of the air springs being mounted on a selected one of the axle and a respective one of the axle seats, each one of the pair of air springs extending upwardly and being attached to the vehicle structure, and means immovably mounted on and extending between the vehicle structure and the axle, a portion of the means being movable in certain directions for cooperating with the control arms and the air springs to control forces imposed on the axle during operation of the vehicle structure, so that the suspension assembly minimizes wind-up of the axle.

BRIEF DESCRIPTION OF THE DRAWINGS

The preferred embodiments of the invention, illustrative of the best mode in which applicants have contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

Figure 2:
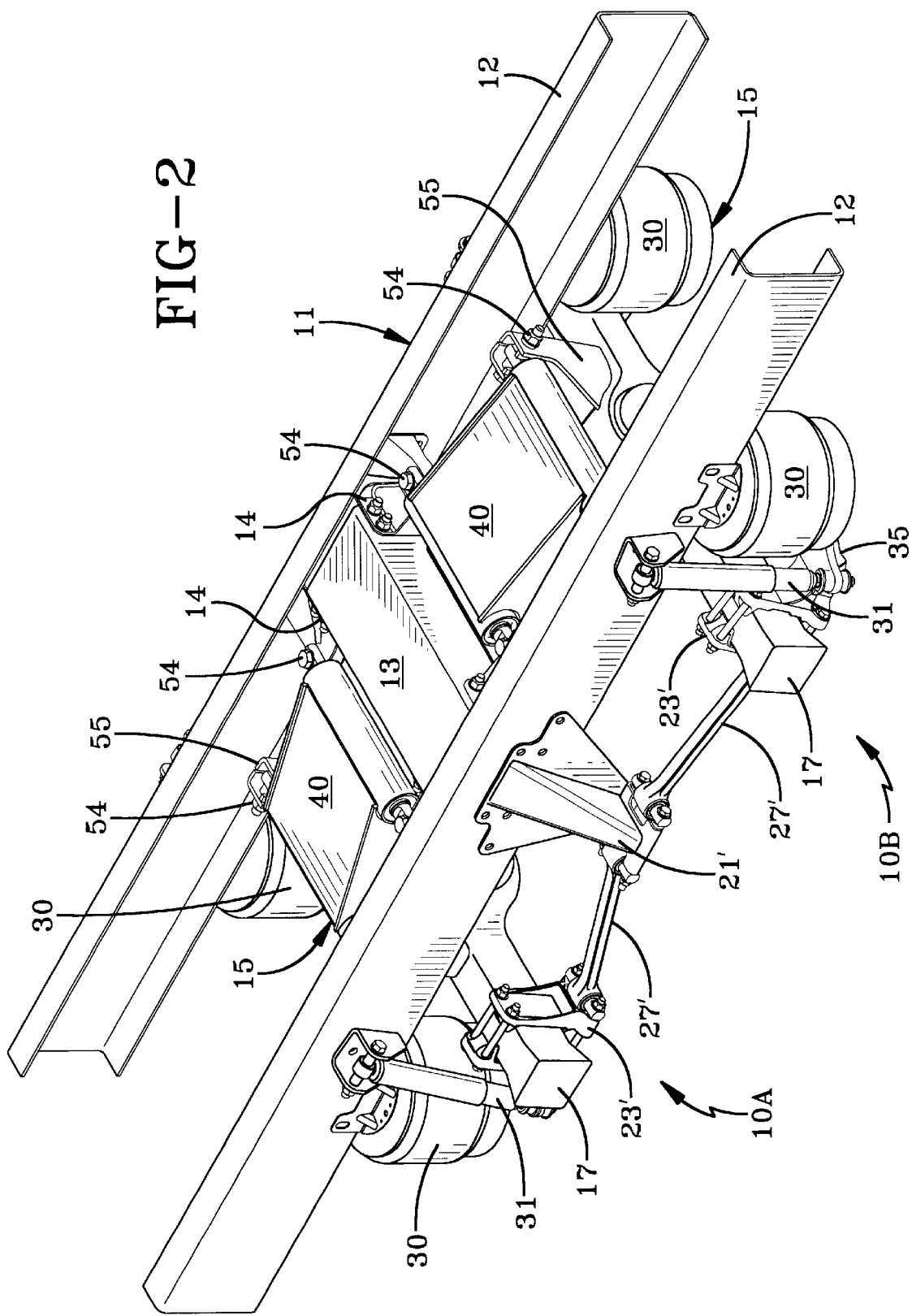
FIG. 2 is a perspective view of the suspension assembly of the present invention, shown mounted on a vehicle frame in tandem and supporting a pair of axles.
Figure 5:
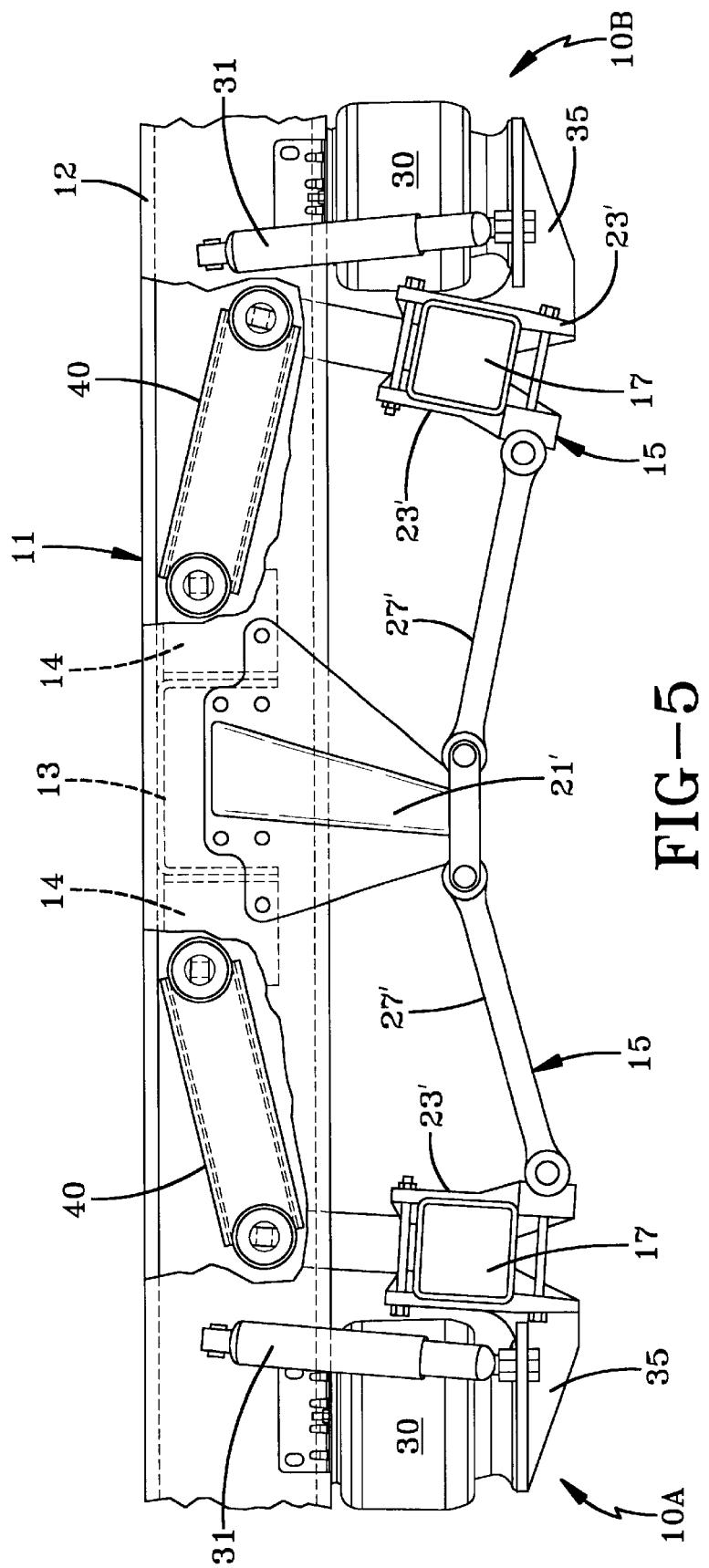
FIG. 5 is a fragmentary side view, with portions broken away and hidden parts shown in phantom lines, of the suspension assemblies, axles and vehicle frame of FIG. 2.

A pair of axle/suspension systems each incorporating the suspension assembly of the present invention each are indicated generally at 10, and are shown in FIGS. 2 and 5.

More specifically, axle/suspension system 10A is a leading arm-type air-ride axle/suspension system, and system 10B is a trailing arm-type air-ride axle/suspension system. Each axle/suspension system 10 is shown mounted on a frame 11 of a vehicle. It is understood that both axle/suspension systems 10 could be of the leading arm-type or of the trailing arm-type without affecting the overall concept of the present invention. Each axle/suspension system 10 includes a suspension assembly 15 which mounts an axle 17 on vehicle frame 11.

So that suspension assembly 15 of the present invention can be best understood, a typical prior suspension assembly now will be described.

Figure 1A:
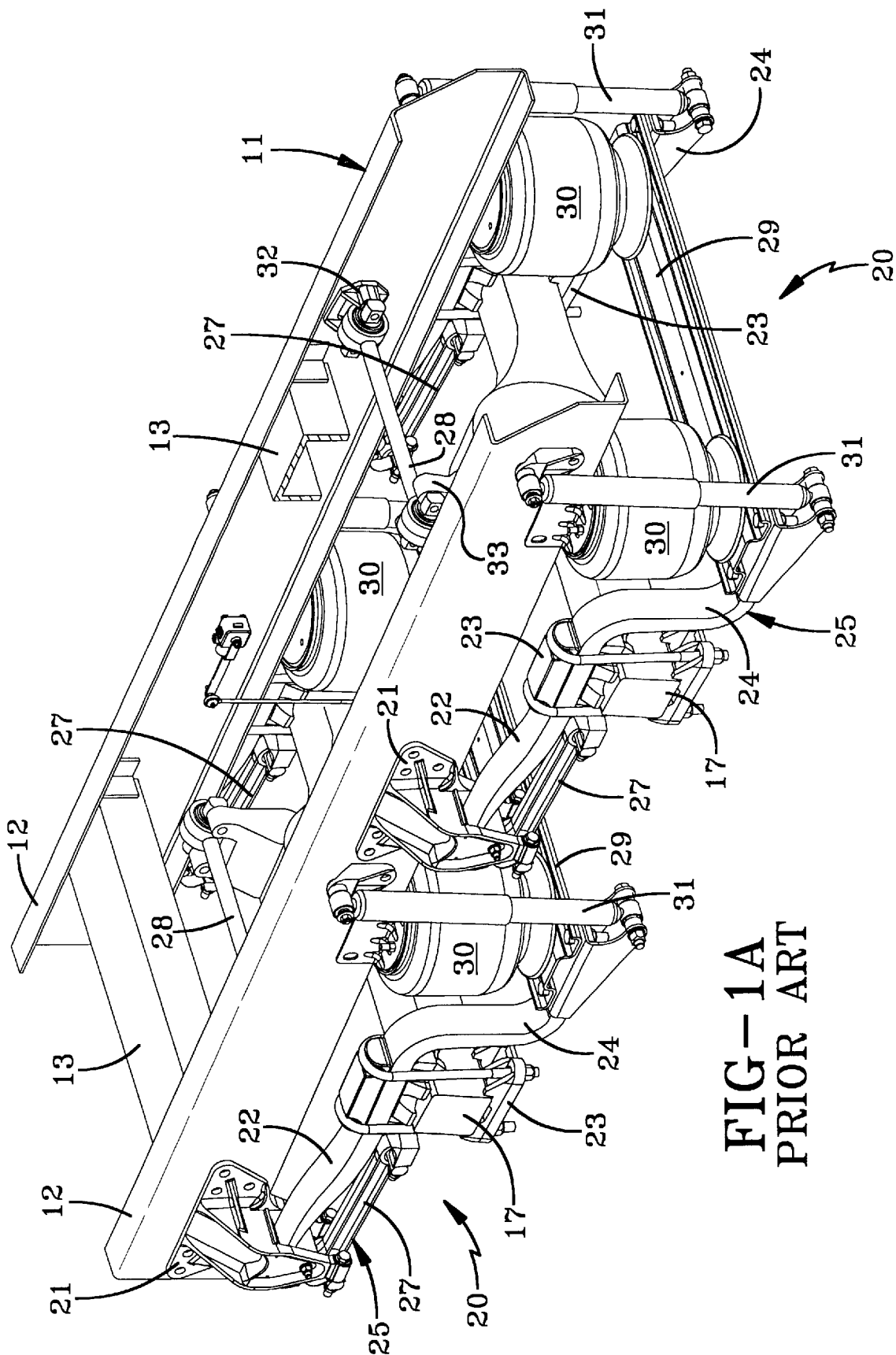
FIG. 1A is a perspective view of a pair of prior art suspension assemblies, with each one of the pair supporting an axle and shown mounted on a vehicle frame which is partially in section.
Figure 1B:
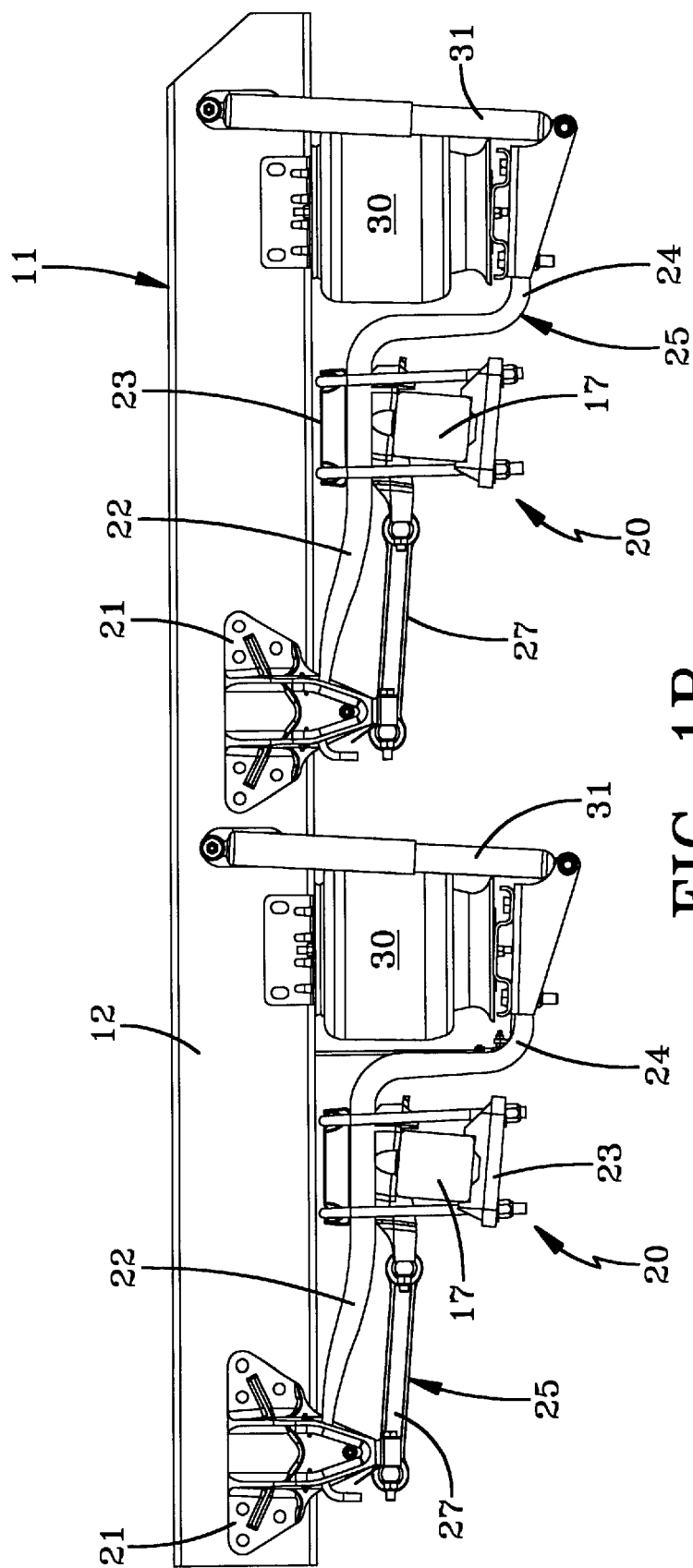
FIG. 1B is a side view of the prior art structures shown in FIG. 1A.

A pair of axle/suspension systems each incorporating a prior art suspension assembly each are indicated generally at 20, and are shown in FIGS. 1A and 1B. More particularly, each axle/suspension system 20 is a trailing arm-type air-ride axle/suspension system, and is shown mounted on vehicle frame 11. Each axle/suspension system 20 includes a suspension assembly 25 which mounts axle 17 on vehicle frame 11. Although many different types of vehicle frames exist which require different suspension assembly characteristics depending on the application, such as heavy and medium duty commercial vehicle applications or light duty vehicle applications, a typical heavy duty vehicle frame of the type commonly utilized on trucks is shown in FIGS. 1A and 1B and is described hereinbelow.

Vehicle frame 11 typically is formed of a sturdy material such as steel, and unless otherwise noted, the components of prior art axle/suspension system 20 also are formed of steel or a similar sturdy metal. Vehicle frame 11 includes a pair of spaced-apart, parallel, longitudinally extending, and elongated members 12. Each member 12 is a generally C-shaped structure and is disposed in an inboardly facing opposed relationship to the other member. Elongated members 12 are rigidly interconnected by a pair of longitudinally spaced apart, parallel and transversely extending cross members 13. Each cross member 13 is an inverted U-shaped structure, and is nested in and rigidly connected by any suitable means to each elongated member 12. It is understood that cross members 13 can have other shapes or designs without affecting the concept of the present invention.

Inasmuch as vehicle frame 11 shown in prior art FIGS. 1A and 1B mounts two generally identical axle/suspension systems 20, only one of the systems and its associated suspension assembly 25 will be described hereinbelow.

Prior art suspension assembly 25 is mounted on vehicle frame 11 by a pair of hangers 21, with each one of the pair being mounted on and depending from a respective one of elongated members 12. More specifically, a front end of each one of a pair of trailing arms or beams 22 is constrained vertically by a respective one of hangers 21 in a manner well known in the suspension art. An axle seat assembly 23 is rigidly mounted in a conventional manner on a central portion of each arm 22 and forms a part of the arm or beam. Each axle seat assembly 23 also rigidly captures a portion of axle 17, which in turn extends transversely across vehicle frame 11.

An extension 24 of each beam 22, which extends longitudinally rearwardly of axle 17, provides support for mounting an elastomeric air spring 30 on each of the arms. However, it is understood by those skilled in the suspension art that beam extension 24 lacks certain traditional beam functions, but rather provides a convenient mounting location for air springs 30 of suspension assembly 25. An auxiliary support member 29 extends transversely between the rear ends of beam extensions 24, to aid in mounting/stabilizing air springs 30. Specifically, each end of support member 29 is securely mounted on a respective one of the rear ends of beam extensions 24. A bottom portion of each air spring 30 is mounted on a respective one of the ends of support member 29 by usual means, and extends between the support member end and its respective vehicle frame elongated member 12, to which a top portion of the air spring is securely mounted. Similarly, a shock absorber 31 is securely mounted on and extends between the rear end of each beam extension 24 and its respective elongated frame member 12 adjacent to its respective air spring 30.

Beams 22 are two of the five major components or "links" that comprise suspension assembly 25. Two other links are longitudinal control arms 27. Each control arm 27 is pivotally mounted at its front end, through a bushing (hidden from view), to a respective one of hangers 21. Each control arm 27 is pivotally mounted at its rear end, through a bushing (hidden from view), to its respective axle seat 23. However, it is understood that control arms 27, and thus two of the five major links of prior art suspension assembly 25, can be eliminated by pivotally attaching the front end of each beam 22 to its respective hanger 21 via a bushing, as is well known in the suspension art.

The fifth link of suspension assembly 25 is lateral control arm 28. More particularly, lateral control arm 28 is pivotally mounted at one of its ends through a bushing/bracket assembly 32, to a selected one of elongated frame members 12. The other end of lateral control arm 28 is pivotally mounted, through a bushing/bracket assembly 33, to a central portion of axle 17. It is understood and well known in the art that lateral control arm 28 of the other suspension assembly 25 of the tandem pair of suspension assemblies mounted on vehicle frame 11, is mounted in opposite fashion, namely, to the other vehicle frame member 12 and the central portion of axle 17.

The five major components or links of prior art suspension assembly 25 control the various loads, described hereinabove, acting on axle 17 as follows. Vertical loads are controlled by air springs 30 and the front ends of beams 22. Lateral loads are controlled by lateral control arm 28. Longitudinal loads are controlled by longitudinal control arms 27. Roll is controlled by air springs 30 and beams 22, with up to about 90 percent of the control being achieved by the beams. Yaw is limited by lateral control arm 28, longitudinal control arms 27 and beams 22. Finally, axle wind-up, typically caused by vehicle braking and acceleration, and which is significant in prior art suspension assembly 25, is controlled by air springs 30, and the front ends of beams 22. It is understood that in prior art suspension assemblies which eliminate longitudinal control arms 27 by mounting the front end of each beam 22 to its respective hanger 21 via a pivotal bushing attachment, the forces controlled by longitudinal control arms 27 are instead reacted by the beams. It is further understood that prior art suspension assemblies 25 are considered to be "reactive-type" suspensions by virtue of the substantial wind-up or torque forces created by axle rotation in a beam-type suspension assembly. It also is well known to those skilled in the art that such a beam 22 is highly stressed, and thus is expensive to manufacture and assemble.

Turning now to suspension assembly 15 of the present invention, only axle/suspension system 10 in which the present invention suspension assembly is incorporated will be described, inasmuch as vehicle frame 11 already has been described hereinabove with reference to prior art axle/suspension system 20, and typically will be the same or similar regardless of the type of axle/suspension system that is mounted thereon.

A pair of axle/suspension systems each incorporating suspension assembly 15 of the present invention, as previously noted hereinabove, each are indicated generally at 10A and 10B, and are shown in FIGS. 2 and 5. Inasmuch as leading arm-type air-ride axle/suspension system 10A and trailing arm-type air-ride axle/suspension system 10B are similar except for their leading or trailing orientation, only trailing arm axle/suspension system 10B will be described herein for illustrating the environment in which suspension assembly 15 of the present invention is incorporated.

Axle/suspension system 10B includes suspension assembly 15 which mounts axle 17 on vehicle frame 11. Suspension assembly 15 is mounted on vehicle frame 11 by a pair of hangers 21' (only one shown). Each hanger 21' is mounted on and depends from a respective one of elongated frame members 12. A front end of each one of a pair of longitudinal control arms 27' is pivotally mounted on a respective one of hangers 21' via a bushing (hidden from view) in a manner well known in the vehicle suspension art. Each control arm 27' is pivotally mounted at its rear end, through a bushing (hidden from view), to a respective one of a pair of axle seats 23'. Each axle seat 23' rigidly captures a portion of axle 17 adjacent to a respective one of the ends of the axle, which in turn extends transversely across vehicle frame 11.

A support member 35 is mounted on each axle seat 23' and extends longitudinally rearwardly of axle 17. Support members 35 provide a platform for mounting a pair of air springs 30. More specifically, a bottom portion of each air spring 30 is mounted on a respective one of support members 35 by usual means, and extends between the support member and its respective vehicle frame elongated member 12, to which a top portion of the air spring is securely mounted. Similarly, a shock absorber 31 is securely mounted on and extends between each support member 35 and a respective one of elongated members 12 adjacent to its respective air spring 30.

In accordance with one of the key features of the present invention, a fabricated torque box 40 is mounted on and extends between vehicle frame 11 and axle 17. Thus, it can be seen, especially by referring to FIGS. 2 and 5, that suspension assembly 15 of the present invention is comprised of only three major components or links, those being the pair of longitudinal control arms 27' and torque box 40. This is compared and contrasted to prior art suspension assembly 25 which, depending on the type of suspension assembly, includes five major components as shown in FIGS. 1A and 1B, or in an alternative prior art design, can include three major components by eliminating longitudinal control arms 27 and attaching beams 22 to frame hangers 21 via bushings. However, in the former embodiment shown in FIGS. 1A and 1B, the additional parts add complexity, weight and cost to suspension assembly 25, and as discussed hereinabove, in particular it is the utilization of traditional beams that adds weight, cost and complexity to the suspension assembly. Although an alternative design eliminates longitudinal control arms 27, it is the use of a pair of traditional beams, as discussed hereinabove, which greatly increases manufacturing costs of the suspension assembly and generally adds weight and complexity to the assembly.

In contrast, the utilization of an integrated fabricated torque box 40, together with a pair of simple longitudinal control arms 27', to form suspension assembly 15 which is free of traditional beams, significantly reduces the manufacturing cost, complexity and weight of suspension assembly 15 of the present invention over prior art suspension assemblies, including suspension assembly 25 shown in FIGS. 1A and 1B and described hereinabove. Despite its reduced number of parts and/or complexity, suspension assembly 15 of the present invention maintains the position of axle 17 relative to frame 11 during operation of the vehicle, and still saves weight and cost. In addition, suspension assembly 15 of the present invention has increased design flexibility when compared to prior art suspension assemblies, whereby the inventive suspension assembly can be readily changed to meet different types of vehicle suspension needs, such as roll rate or other parameters. Moreover, the beam-free design of suspension assembly 15 of the present invention enables the suspension assembly to be non-reactive or substantially free from axle wind-up caused by braking and acceleration of the vehicle.

Figure 3:
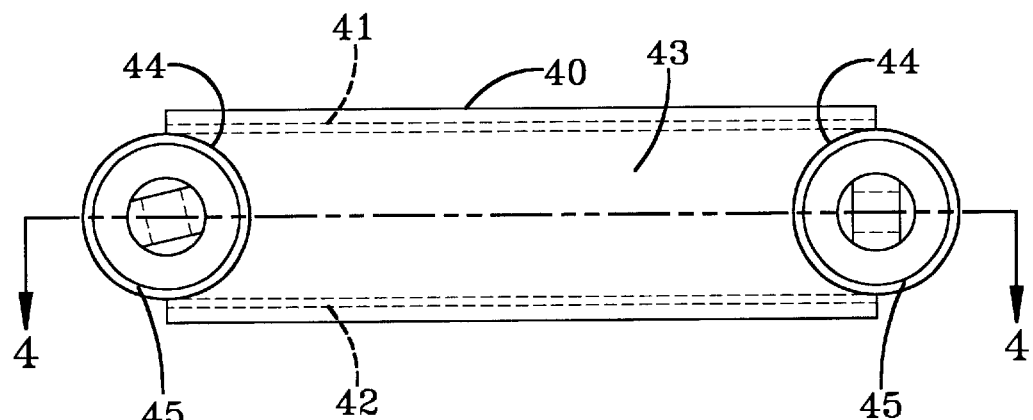
FIG. 3 is a side view of the torque box which forms a part of the suspension assembly of the present invention, with hidden portions shown in phantom lines.
Figure 4:
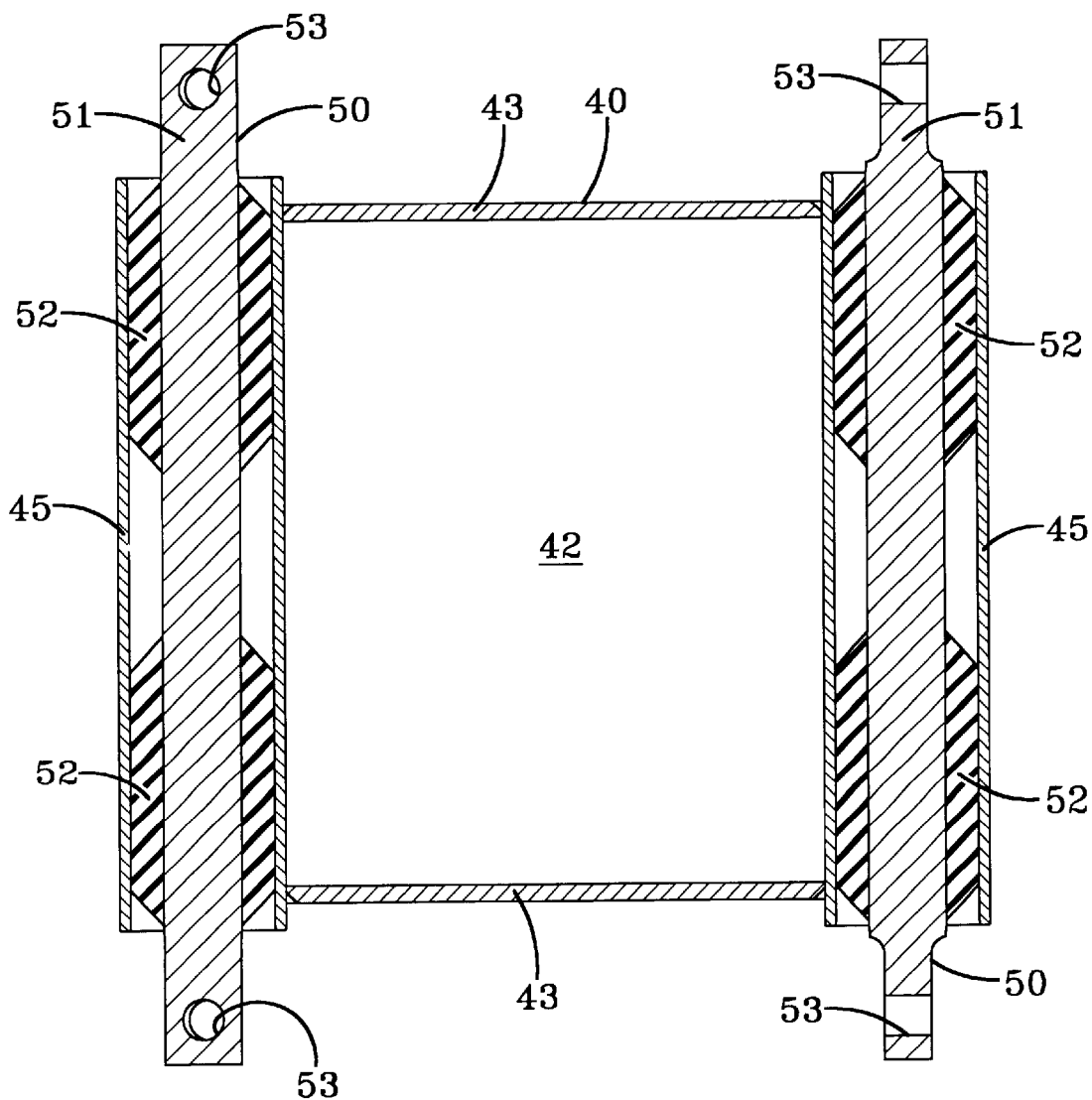
FIG. 4 is a sectional view taken along lines 4—4 of FIG. 3.

Specifically, and referring especially to FIGS. 3 and 4, torque box 40 is a generally rigid, rectangular-shaped fabricated steel box having spaced-apart top and bottom closure plates 41, 42, respectively, and a pair of spaced-apart sidewalls or shear plates 43 which extend between and interconnect the closure plates by any suitable means such as welding. The preferred thickness of each closure plate 41, 42, is from about 0.2 inches to about 0.25 inches. Shear plates 43 each preferably have a thickness of from about 0.2 inches to about 0.5 inches. Each end of each shear plate 43 is formed with a generally half-circle shaped cutout 44 to accommodate seating of a transversely extending mounting tube 45 on each end of plates 41, 42, 43. Each mounting tube 45 is welded to closure plates 41, 42, and shear plates 43 and extends the entire width of plates 41, 42, 43. This fabricated construction of torque box 40 saves weight in the torque box. More particularly, since shear plates 43 are subjected to higher loads in transferring loads from the mounting tubes, the shear plates preferably have a greater thickness, but since closure plates 41, 42 are separate pieces due to use of the fabrication method, they can be thinner, thus saving weight. However, if desired, the fabrication can be simplified by forming a selected one of closure plates 41, 42 and shear plates 43 as a single piece, and then attaching the other closure plate to complete torque box 40. Alternatively, the present invention also contemplates formation of torque box 40 from other processes and materials, such as molding using carbon-reinforced resins or the like.

In accordance with another of the important features of the present invention, torque box 40 includes a barbell bushing assembly 50 which is press fit into each mounting tube 45. More specifically, each barbell bushing assembly 50 includes a shaft 51, wherein shaft 51 has a length greater than the length of its respective mounting tube 45. The length of each shaft 51 preferably is short enough to fit between elongated members 12 of vehicle frame 11, but should be as long as possible to minimize loads on the connection points at vehicle frame 11 and axle 17. Shaft 51 preferably has a length of about 25.5 inches.

A bushing 52 is molded directly on shaft 51 adjacent to each end of the shaft in a manner well known in the rubber molding art. Each bushing 52 preferably has a transverse length of from about 4 to about 6 inches and a diameter of about 3.4 inches in the free state. The preferred durometer of each bushing 52 is about 60 and the distance between the bushings of each barbell bushing assembly 50 preferably is from about 12 inches to about 20 inches. The preferred longitudinal spacing between the centers of mounting tubes 45 is from about 12 inches to about 20 inches, with about 16 inches being preferred.

As mentioned hereinabove, each barbell bushing assembly 50 is mounted within its respective mounting tube 45 by press fitting bushings 52 of the assembly within the tube. Each end of each shaft 51 extends outwardly from mounting tube 45 and is formed with an opening 53 for immovably mounting torque box 40 on vehicle frame 11 and axle 17. As shown in FIGS. 2 and 5, torque box 40 is disposed in a generally inclined orientation relative to horizontal vehicle frame 11. More particularly, shaft 51 of torque box 40 disposed closest to cross member 13 of vehicle frame 11 is located above the other shaft to create the inclined disposition of the torque box. Upwardmost shaft 51 is positioned in its respective mounting tube 45 so that openings 53 are disposed generally vertically and lowermost shaft 51 is disposed in its respective mounting tube 45 so that openings 53 are oriented generally horizontally. Openings 53 of upwardmost shaft 51 of torque box 40 are aligned with complementary-shaped and sized openings (not shown) formed in cross member mounting brackets 14. Fasteners 54 are passed through the aligned openings of upwardmost shaft 51 and brackets 14 to rigidly secure the upwardmost end of torque box 40 to vehicle frame 11. A pair of transversely spaced brackets 55 are mounted on top of axle 17 so that openings. 53 formed on lowermost shaft 51 of torque box 40 can be aligned with complementary-sized and shaped openings formed in brackets 55. Fasteners 54 similarly are passed through the aligned openings of lowermost shaft 51 and brackets 55 to complete the immovable attachment of torque box 40 to axle 17. Thus, torque box 40 is immovably secured to vehicle frame 11 and axle 17 to complete the assembly of suspension assembly 15 of the present invention.

Suspension assembly 15 of the present invention operates in the following manner. During operation of a vehicle, its axle is subjected to many forces which can alter the vertical, lateral and/or longitudinal position of the axle in relation to the vehicle frame, and also can cause axle movement such as roll, yaw and wind-up. As discussed hereinabove, prior art suspension assemblies typically utilized five components or links, including a pair of conventional beams, to counteract such forces, or alternatively, utilized three components or links wherein the beam links were modified to react the forces typically reacted by a pair of longitudinal control arms. However, in either case, utilizing a traditional beam, which is a highly stressed component, makes the suspension assembly relatively expensive to manufacture, complex, and adds overall weight to the suspension assembly. Moreover, utilization of a conventional beam as a link in the suspension assembly makes the suspension assembly a "reactive" suspension assembly, defined herein as an assembly which allows significant axle wind-up or rotation. Specifically, prior art suspension assemblies such as suspension assembly 25 shown in FIGS. 1A and 1B and described hereinabove, exhibit axle wind-up values of about nine (9) to about ten (10) degrees.

In contrast, suspension assembly 15 of the present invention eliminates the axle wind-up or torque problem by eliminating the use of traditional beams in the suspension assembly, and in some cases, reducing the number of components in the assembly. This efficiency of the present invention results in cost and weight savings, as well as a suspension assembly that is "non-reactive," because it minimizes axle wind-up. More particularly, suspension assembly 15 exhibits axle wind-up values of about one (1) degree or less, or about ten (10) percent of the wind-up values present in conventional suspension assemblies.

More particularly, vertical loads and roll forces still are reacted by air spring 30 of present invention suspension assembly 15, as is the case in prior art suspension assembly 25. Longitudinal control arms 27' in suspension assembly 15 of the present invention react longitudinal loads in generally the same way as found in prior art suspension assembly 25. However, fabricated torque box 40 used in the present invention replaces the function of lateral control arm 28 found in prior art suspension assembly 25, as well as beams 22 found in those conventional suspension assemblies. More specifically, torque box 40 reacts lateral loads, contributes to reacting longitudinal loads and yaw, and replaces the function of a conventional beam in reacting up to about 90 percent of roll movements of axle 17. Longitudinal control arms 27' also contribute to reacting yaw. Thus, it can be seen that the three components or links of suspension assembly 15 of the present invention accomplishes the same results as prior art suspension assemblies, but with a reduced number of parts and/or complexity, and with attendant weight and cost savings. This is due primarily to the use of fabricated torque box 40 and the elimination of traditional beams which are common in prior art suspension assemblies such as suspension assembly 25. Thus, the purpose of torque box 40, to transfer loads between barbell bushing assemblies 50, is achieved in an uncomplicated, lightweight and cost-effective structure.

Suspension assembly 15 is able to successfully react the various forces imposed on axle 17, despite the rigid construction of torque box 40 and the immovable attachment of the torque box 40 to vehicle frame 11 and the axle. This desired result is achieved due to the inclusion of bushings 52 in torque box 40. Bushings 52 provide for movement in various directions of the subassembly of plates 41, 42, 43 and mounting tubes 45, relative to torque box shafts 51 which are immovably attached to vehicle frame 11 and axle 17. The compliance of elastomeric bushings 52 enable such relative movement. It is understood that the present invention contemplates the use of compliant structures other than bushings 52, such as coil springs or the like, to similarly achieve the inventive concept.

In accordance with one of the key advantages of the present invention, suspension assembly 15, due to the structure of torque box 40, provides an optimum level of roll stiffness or angular deflection of axle 17. Stated differently, if a suspension assembly were infinitely rigid in roll, the loads generated when one wheel is jounced due to contact with a pothole or a curb would be unreasonably large and the axle/suspension system structure would be damaged. If the suspension assembly has too little roll stiffness, the vehicle would roll too much during maneuvering and would be unacceptable to the driver and even be susceptible to tipping over. The spacing of bushings 52 on each of the pair of barbell bushing assemblies 50 acts as two springs spread at a distance to provide a roll rate, despite the overall rigidity and immovable mounting of torque box 40, due to the spring rate of the bushings combined with the transverse distance between each pair of bushings. Bushings 52 also provide conical stiffness which augments the above-described roll stiffness. The generally rigid torque box 40 connects the two barbell bushing assemblies 50 in series in roll. This increases the compliance of suspension assembly 15 so that a low enough roll rate may be achieved with bushings of reasonable size, since small bushings have high spring rates that would not provide enough compliance. Thus, suspension assembly 15 of the present invention, through the use of torque box 40, can achieve a preferred roll rate of the suspension assembly of about 150,000 inlb./deg over a plus or minus two degree working range. In addition, achieving the ideal roll rate can be achieved without sacrificing the structural integrity of suspension assembly 15.

In accordance with another of the important features of suspension assembly 15 of the present invention, by changing the width between bushings 52 of each barbell bushing assembly 50, suspension assembly 15 may be "tuned" to give any performance desired. The fact that rubber bushings 52 provide a rising spring rate as they are deflected produces a desirable characteristic of rising roll rate. At small roll angles, the roll rate is lower than at high angles. This translates into the effect that small deflections encountered by the vehicle and axle 17 due to bumps in the road produce small loads and minimize fatigue damage, while large roll motions such as cornering maneuvers provide a higher roll rate and minimize vehicle roll. This tuning feature of the present invention is one of the structural advantages that enables suspension assembly 15 to be easily adapted for use in various types of vehicles having differing suspension characteristic needs.

In addition, the longitudinal spacing of mounting tubes 45 is long enough to provide good kinematic behavior of suspension assembly 15, but short enough to minimize the weight of torque box 40 and provide compact packaging of the assembly. Also, the width of torque box 40 is optimized to minimize stress on shear plates 43 and minimize weight. More specifically, the wider the width of torque box 40, the lower the stress that is experienced by shear plates 43 at mounting tubes 45. However, making the width of torque box 40 greater also adds weight. Thus, the specifications for torque box 40 optimizes structural requirements while minimizing weight. One of the important features of suspension assembly 15 of the present invention is that the width of torque box 40 can be optimized depending on the application. Moreover, utilization of brackets 14 to serve the dual purpose of mounting vehicle frame cross member 13 and the upwardmost end of torque box 40 serves to minimize complexity, weight and cost as well.

It is understood that torque box 40 could be mounted lower on vehicle frame 11 than shown in FIGS. 2 and 5, depending on the application. Tandem torque boxes 40 are shown high mounted between vehicle frame 11 in a leading-trailing fashion. This mounting orientation is significant because to package torque box 40 going forward on the forwardmost drive axle of a conventional tandem axle arrangement would be difficult due to clearance between parts of axle 17 and torque box 40 during articulation of the axle. Moreover, low mount pairs of longitudinal control arms 27' for tandem axle/suspension systems 10A and 10B, are attached to a single pair of central hangers 21', which also reduces complexity, weight and cost of suspension assemblies 15.

Figure 6:
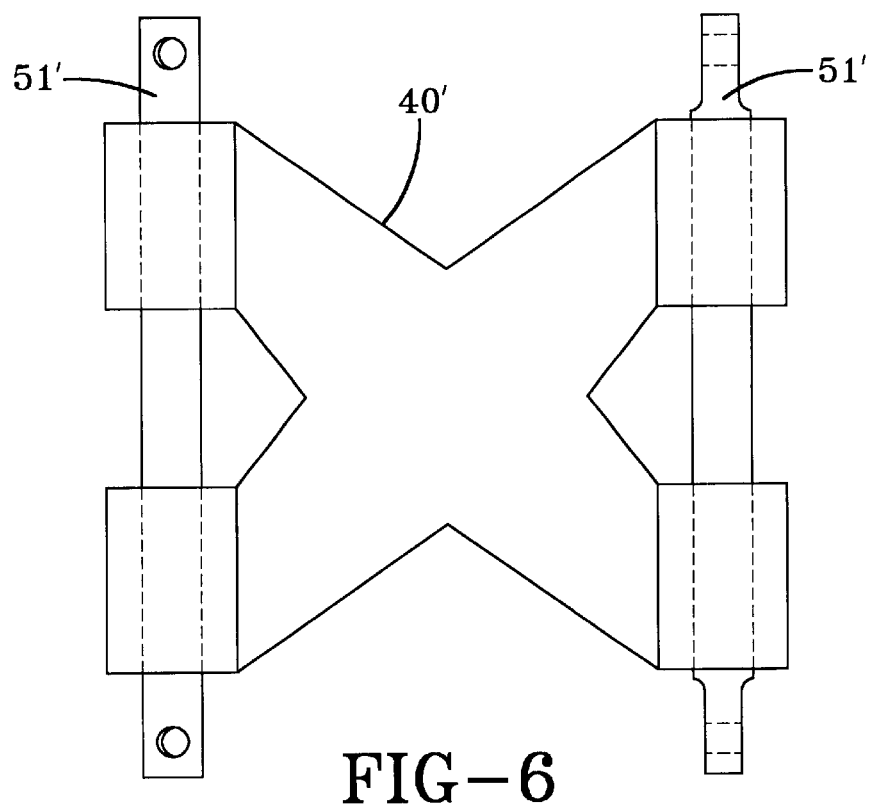
FIG. 6 is a top plan view, with hidden portions shown in phantom lines, of a second embodiment of the torque box component of the suspension assembly of the present invention.
Figure 7:
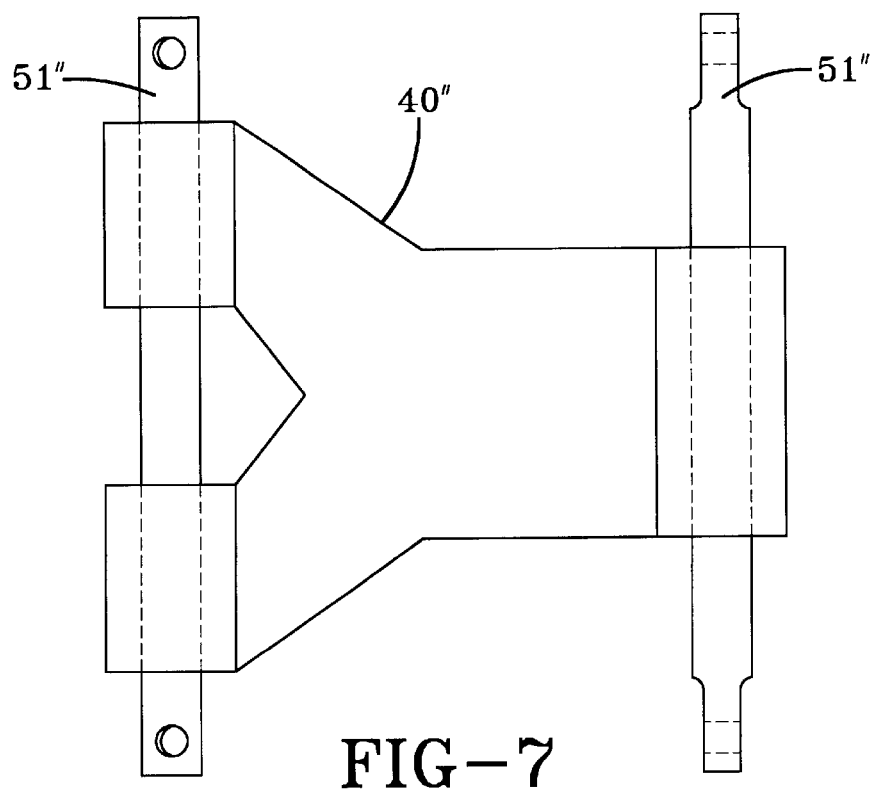
FIG. 7 is a view similar to FIG. 6, of a third embodiment of the torque box component of the suspension assembly of the present invention.

It is understood that various structural embodiments of torque box 40 useful in suspension assembly 15 of the present invention could be utilized, without affecting the overall concept of the invention. Thus, a second embodiment of the torque box is shown in FIG. 6, wherein generally rigid torque box 40' has a generally cruciform shape. A third embodiment of the torque box is shown in FIG. 7, wherein rigid torque box 40" has a generally Y-shape. In the embodiment shown in FIG. 7, rear shaft 51 may be utilized with a single bushing 52 rather than a pair of bushings.

Accordingly, the vehicle suspension assembly of the present invention is simplified, provides an effective, safe, inexpensive, and efficient assembly which achieves all the enumerated objectives, provides for eliminating difficulties encountered with prior suspension assemblies, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved vehicle suspension assembly is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A suspension assembly for mounting an axle on a longitudinally extending vehicle structure, said suspension assembly including:

a) a pair of transversely spaced hangers, each one of said pair of hangers being mounted on and depending from said vehicle structure;

b) a pair of longitudinally extending control arms, each one of said pair of control arms having a first end and a second end, said first end of each one of the control arms being pivotally attached to a respective one of said pair of hangers through a bushing, and said second end of each one of said control arms being pivotally attached to a respective one of a pair of axle seats through a bushing, said pair of axle seats immovably capturing a transversely extending axle;

c) a pair of transversely spaced air springs, each one of said pair of air springs being mounted on a selected one of said axle and a respective one of said axle seats, each one of the pair of air springs extending upwardly and being attached to the vehicle structure; and d) torque means mounted on and extending between said vehicle structure and said axle, said means including a generally box-like structure having a first end and a second end, said means further including a pair of shafts, each one of said shafts having a pair of ends and at least one compliant structure disposed about the shaft, each one of said shafts being mounted in a respective one of said box-like structure ends, said pair of ends of each one of the shafts being immovably connected to a selected one of said vehicle structure and said axle, whereby said compliant structure of said torque means is movable in certain directions for cooperating with said control arms and said air springs to control forces imposed on the axle during operation of the vehicle structure, so that said suspension assembly minimizes wind-up of said axle.

2. The suspension assembly of claim 1, in which said box-like structure is formed of fabricated metal; in which said compliant structure is an elastomeric bushing molded about each one of said shafts; and in which each one of the shafts is press fit into a respective one of said fabricated box-like structure ends.

3. The suspension assembly of claim 2, in which said fabricated structure generally is hollow and generally rectangular shaped; in which a mounting tube is rigidly connected to and closes each of said ends of the fabricated structure; and in which one of said shafts formed with said bushing is press fit into each of said mounting tubes.

4. The suspension assembly of claim 3, in which a pair of spaced apart bushings is molded to each one of said shafts; in which each one of said pair of bushings has a transverse length of from about 4 to about 6 inches and a diameter of about 3.4 inches in the free state; and in which each one of the bushings has a durometer of about 60.

5. The suspension assembly of claim 4, in which said bushings are transversely spaced from about 12 to about 20 inches; in which said mounting tubes are longitudinally spaced from about 12 to about 20 inches; in which the length of each one of said shafts is about 25.5 inches; and in which each one of a plurality of walls of said fabricated structure has a thickness of from about 0.2 inches to about 0.5 inches.

6. The suspension assembly of claim 5, in which said longitudinal spacing between said mounting tubes is about 16 inches.

7. The suspension assembly of claim 2, in which said fabricated structure generally is hollow and generally cruciform-shaped; in which a pair of mounting tubes each is rigidly connected to and closes each of said ends of the fabricated structure; and in which each one of said shafts is formed with a pair of said bushings and is press fit into a respective one of said pairs of said mounting tubes.

8. The suspension assembly of claim 7, in which each one of said pair of bushings molded to each one of said shafts are spaced apart; in which each one of the pair of bushings has a transverse length of from about 4 to about 6 inches and a diameter of about 3.4 inches in the free state; and in which each one of the bushings has a durometer of about 60.

9. The suspension assembly of claim 8, in which said bushings are transversely spaced from about 12 to about 20 inches; in which said mounting tubes are longitudinally spaced from about 12 to about 20 inches; in which the length of each one of said shafts is about 25.5 inches; and in which each one of a plurality of walls of said fabricated structure has a thickness of from about 0.2 inches to about 0.5 inches.

10. The suspension assembly of claim 9, in which said longitudinal spacing between said mounting tubes is about 16 inches.

11. The suspension assembly of claim 2, in which said fabricated structure generally is hollow and generally Y-shaped; in which a mounting tube is rigidly connected to and closes said second end of the fabricated structure; in which each one of a pair of mounting tubes is rigidly connected to and closes said fabricated structure first end; in which a first shaft is formed with a pair of said bushings and is press fit into said first end pair of mounting tubes; and in which a second shaft is formed with one of said bushings and is press fit into said second end mounting tube.

12. The suspension assembly of claim 11, in which each one of said pair of bushings molded to said first end shaft are spaced apart; in which each one of said bushings has a transverse length of from about 4 to about 6 inches and a diameter of about 3.4 inches in the free state; and in which each one of said bushings has a durometer of about 60.

13. The suspension assembly of claim 12, in which said first end bushings are transversely spaced from about 12 to about 20 inches; in which said mounting tubes are longitudinally spaced from about 12 to about 20 inches; in which the length of each one of said shafts is about 25.5 inches; and in which each one of a plurality of walls of said fabricated structure has a thickness of from about 0.2 inches to about 0.5 inches.

14. The suspension assembly of claim 13, in which said longitudinal spacing between said mounting tubes is about 16 inches.

15. The suspension assembly of claim 1, in which said vehicle structure is a vehicle frame comprising a pair of spaced apart, parallel, longitudinally extending elongated main members, and at least one cross member extending transversely between and being rigidly attached to said elongated main members; and in which each one of said pair of hangers is mounted on and depends from a respective one of the main members.

16. The suspension assembly of claim 1, in which each one of said pair of axle seats is formed with a support member for mounting said air spring and a shock absorber, each one of said air springs and said shock absorbers extending between a respective one of said support members and a respective one of said main members, said air springs and said shock absorbers each being mounted on its respective main member.

* * * * *